United States Patent [19]

Malick

[11] Patent Number: 4,887,016
[45] Date of Patent: Dec. 12, 1989

[54] PORTABLE ROBOT WITH AUTOMATIC SET-UP

[75] Inventor: Franklin S. Malick, Monroeville, Pa.

[73] Assignee: Viking Systems International, Inc., Pittsburgh, Pa.

[21] Appl. No.: 98,551

[22] Filed: Sep. 21, 1987

[51] Int. Cl.⁴ .............................................. G05B 19/42
[52] U.S. Cl. .................................. 318/568.13; 364/513
[58] Field of Search ............ 318/568, 568 A, 568 AB, 318/568 D; 364/513

[56] References Cited

U.S. PATENT DOCUMENTS

| | | | |
|---|---|---|---|
| 4,287,459 | 9/1981 | Dahlström | 318/568 |
| 4,481,591 | 11/1984 | Spongh | 318/568 |
| 4,536,690 | 8/1985 | Belsterling et al. | 318/568 |
| 4,547,844 | 10/1985 | Adams | 364/189 |
| 4,561,050 | 12/1985 | Iguchi et al. | 318/568 X |
| 4,562,391 | 12/1985 | Inoue | 318/640 X |
| 4,571,694 | 2/1986 | Inaba et al. | 318/568 |

*Primary Examiner*—Benjamin Dobeck
*Attorney, Agent, or Firm*—Clifford A. Poff

[57] ABSTRACT

A system for allowing a robot to be moved and set up quickly to perform a variety of work tasks at different work locations is disclosed. Once roughly positioned at a work location, the robot uses position sensors to establish in its computer memory a set of coordinate axes which match precisely the intersections of the three planes of a reference structure which is in a fixed position relative to the work location. All robot movements required to carry out the work task are made with respect to this set of coordinate axes so that the work task program remains the same independent of the exact position of the robot. A sensor holder and sensor storage bracket which uses the straight line horizontal and vertical movement capability of the robot to permit a programmed pickup and storage of the sensor is disclosed.

16 Claims, 5 Drawing Sheets

PORTABLE ROBOT WITH AUTOMATIC SET-UP

BACKGROUND OF THE INVENTION

1. Field of the Invention

The present invention relates generally to robots, and, more specifically, to a system for allowing one robot to perform work tasks at a plurality of work locations.

2. Description of the Prior Art

In recent years industrial robots have become vital elements in the further automation of many production line and assembly line operations to allow products produced on such lines to remain cost-competitive. Robots are capable of working without breaks, and are capable of performing monotonous tasks at high speeds without error. Robots have become especially useful for performing repetitive functions such as welding, assembly, riveting, and painting.

A robot contains, at minimum, a computing means with memory, and an arm to which tools may be attached. Conventionally, the robot is bolted to the floor and fixed at a permanent position relative to the work location at which the robot is to perform a specific work task. Such fixed positioning is required as the robot must typically be precisely positioned relative to the work location in order to perform a specific work task. By fixedly positioning the robot at one work location on a production line, the robot is limited to the performance of work tasks at only the one work location. Such a practice, however, does not, in some instances, allow the capabilities of the robot to be fully utilized. For instance, at a production line which is only intermittently operated, the capability of the robot to perform different work tasks and to work 24 hours a day is not utilized.

Because the purchase of an industrial robot requires a large initial capital expense, the purchase of a robot for use in a production line which is only intermittently operated may not be economically justifiable. If, however, a means by which the robot may be usefully utilized for a longer period of time existed, the purchase of the industrial robot may thereby be economically desirable.

Moving a production line to fully utilize the capability of a single robot which is fixedly positioned is usually impractical. The capability of the robot could be fully utilized by providing a means to allow the robot to be positioned quickly at different work production lines. However, because most robots and their control have been difficult to move and have required some reprogramming after a move, such an alternative means has been equally impractical.

It is, therefore, an object of the present invention to provide a system which allows a robot to be moved and set up quickly to perform work tasks at different work locations.

It is a further object of this invention to provide a system which allows the robot to set itself up at a new work location quickly and without the participation of an operator.

It is a still further object of the present invention to provide a method for enabling a robot to establish the position of its tool relative to the work location irrespective of the position of the body of the robot relative to the work location.

It is a further object of this invention to provide a method which allows the robot to automatically pick up and store the tools that it needs to perform a task.

SUMMARY OF THE PRESENT INVENTION

In accordance with the present invention, a system is disclosed for allowing a specific type of robot to perform work tasks at separate work locations. The system comprises work task programs contained in the robotic memory to allow the robot to perform a plurality of work tasks, moving means to allow the robot to be moved to separate locations in a plant, orienting means to allow the robotic memory to become oriented relative to the work location after the robot's position has been fixed, and tool holding means to allow the robot to automatically equip itself with tools In the preferred embodiment of the present invention, the moving means includes a pallet upon which the robot is fixedly mounted, and a fork lift for transporting the pallet and the robot mounted thereupon to a work location. In another embodiment of the present invention, the moving means is a wheeled vehicle with outriggers upon which the robot is fixedly mounted. The wheeled vehicle may further be motorized.

The orienting means may include a reference structure fixedly positioned relative to a work location, a position sensor or sensors held by the robot, and an orientation program contained in the robotic memory to allow the robot to determine, relative to the robot, the location of the reference structure, and, in turn, the work location. The reference structure may also include a first planar surface, a second planar surface, and a third planar surface, each of the first, second, and third planar surfaces being mutually perpendicular to one another.

The tool holding means includes block-like tool handle having a slot into which two gripper fingers can be inserted vertically and a box like storage bracket from which the block-like handle can be removed horizontally.

The method for allowing a robot to perform work tasks at any of a plurality of separate work locations in a plant includes the steps of: moving the robot to a location proximate to a work location, orienting the robotic memory to the work location, picking up a tool from a storage bracket and performing a specific work task defined by a specific work task program.

BRIEF SUMMARY OF THE DRAWINGS

The invention may be better understood with the accompanying drawings in which.

DESCRIPTION OF THE PREFERRED EMBODIMENT

Figure 1:
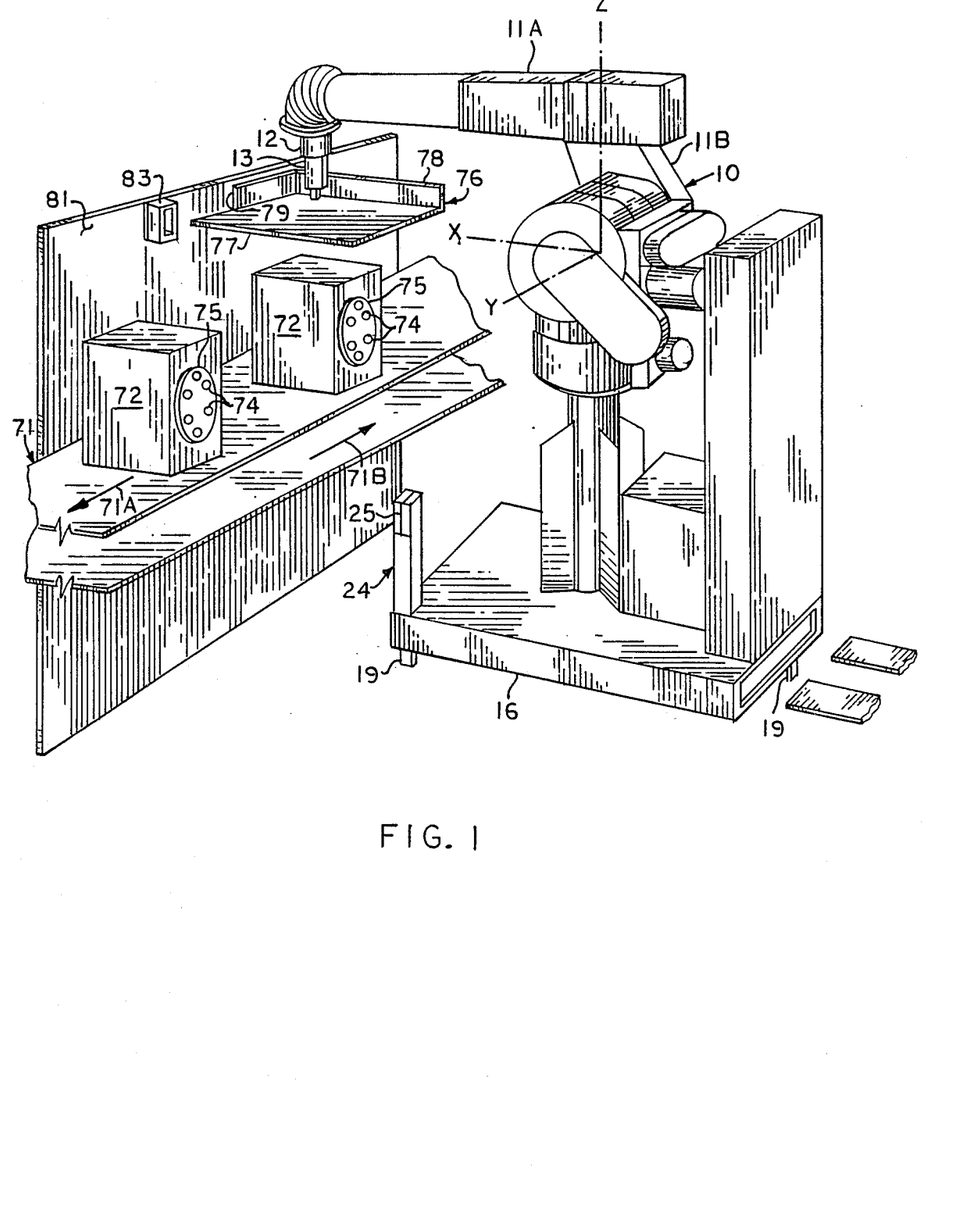
FIG. 1 is an illustration of one embodiment of the present invention in which the robot is mounted upon a pallet for positioning at a work location proximate to a reference structure which allows the orientation of a robotic memory relative to the work location.

Referring now to the illustration of FIG. 1, reference number 10 identifies a 6-axis robot, which includes movable arm parts 11A and 11B, and a hand 12 having a gripper 13 with two fingers. The robot allows simultaneous movements of the hand 12 in each of the 6-degrees of freedom.

The 6-axis robot 10 is the type that describes the location of points in space inside a work envelope by relating the points by cartesian coordinates to a frame of reference which is stored in a computer memory that is also a part of the robot 10. The robotic hand 12 is controlled to make straight line movements between points. A reference frame defines a set of three mutually perpendicular axes parallel to which tool movements are made and against which the cartesian coordinates, which represent the tool tip locations, are measured. The origin and direction of the set of axes can be anything the operator selects. One common set of axes as shown in FIG. 1 has the origin on the vertical center line of the pivotal support pedestal at shoulder level with the X axis on the front to back center line of the robot. Another and particularly useful set of axes is determined from a reference structure 76 which is positioned rigidly with respect to the work location inside the work envelope. One objective of this invention is to provide the tangible means by which a intangible frame can be automatically setup in the robotic memory by using the intangible reference structure.

Furthermore, the robot used with this invention must have the capability of setting up a frame in its memory based on three points which can be either designated manually by the operator or determined in the course of running a computer program in which the robot arm stops midway in a movement between points at a position which is determined by a sensor such as a proximity switch. Typically, the first point designates the origin of the frame, the second point designates the direction of the X axis of the frame and the third point defines the XY plane of the frame. The robot control in the robot used with the present invention employs two kinds of points; namely absolute and relative points. "Absolute" points are points in space whose coordinates are designated with respect to a "global frame" which matches the major axes of the robot. "Relative" points are points whose coordinates are designated relative to any other frame. The robot system must be of a type that can change numbers representing the coordinates of an absolute point to the numbers representing the coordinates of a relative point and vice versa. All frames are defined with absolute points. Furthermore, the robot must have the capability of stopping during a movement between points when a sensor has contacted a surface.

In the illustration of FIG. 1, a robotic controller 14 which includes electronic components and a computer with a memory is located in a control enclosure 15 secured to a pallet 16 or vehicle along with the robotic arm. However, it is to be noted, that alternatively, the robotic controller 14 may be located at a distance from the robotic arm and suitably connected by any conventional connecting means, such as a tether. The pedestal base of the robot 10 is fixedly attached to the pallet 16.

The pallet 16 shown in FIG. 1 includes a central cavity 17 to allow the forks 18 of a fork lift (not shown) to extend therein and thereby lift and move the robot 10 to any one of a plurality of desired locations. The pallet 16 is constructed to rigidly support the weight of the robot 10 thereabove. The pallet 16 further contains three downwardly extending feet 19, two at the front and one at the rear to provide stability to the pallet 16 and robot 10 even if positioned on an uneven floor.

Figure 2:
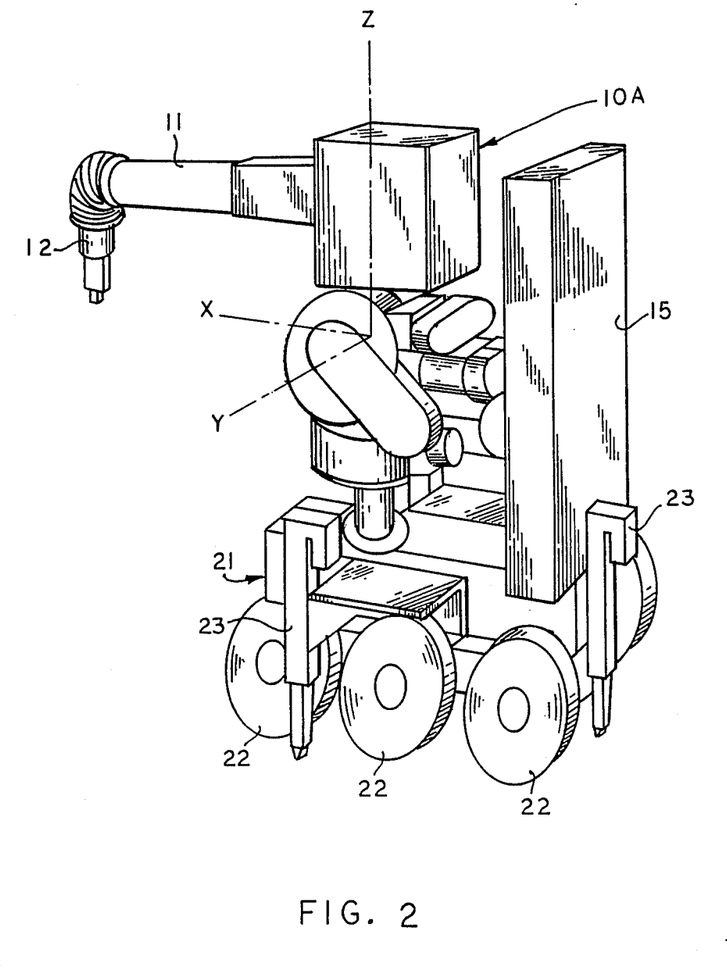
FIG. 2 is an illustration of a second embodiment of a robot which is mounted upon a motorized, wheeled vehicle to be driven from one location to another where the orientation of a robotic memory is carried out according to the present invention.
Figure 3A:
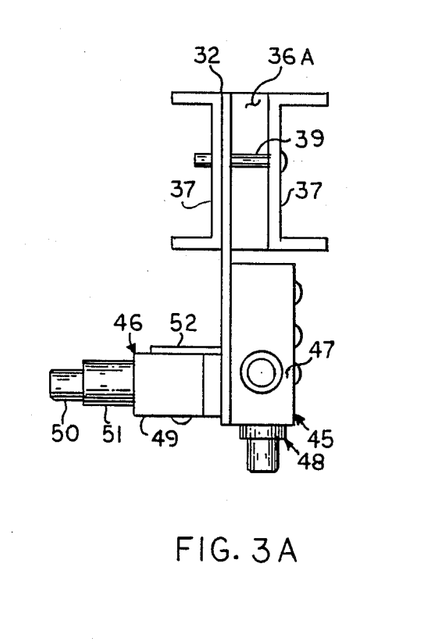
FIGS. 3A, 3B are 3C are front, side and top views respectively, of the sensor assembly for determining the position of the three refer planes of the reference structure.
Figure 3B:
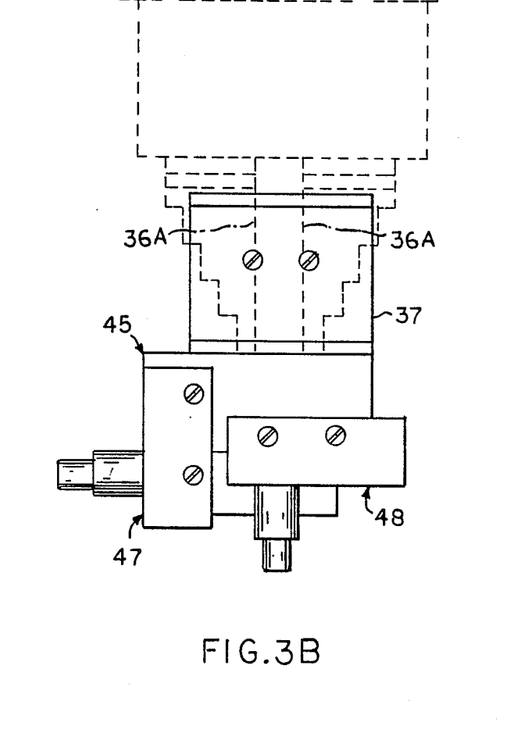
Figure 3C:
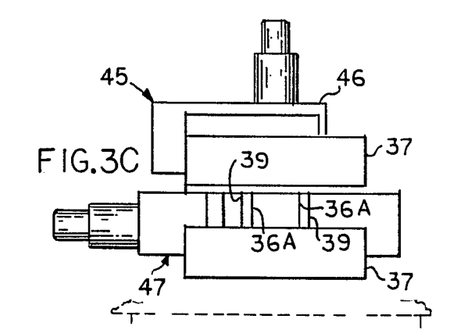

FIG. 2 illustrates a second embodiment of the present invention in which the robot 10A is mounted upon a motorized wheeled vehicle 21. Because the motorized wheeled vehicle 21 is much more expensive than the pallet 16 and because most manufacturing facilities have a fork lift readily available, the additional expense required to purchase a fork lift is rarely required; therefore, the embodiment illustrated in FIG. 1 is the preferred embodiment for most applications. However, in applications in which the robot must be operated in a hostile environment whereat use of a man-operated fork lift is not feasible, such as, for example, when the robot is operated in an area of high radioactivity, use of the motorized wheeled vehicle 22 illustrated in FIG. 2 is necessitated. The wheeled vehicle 21 further includes six driven wheels 22. Three screw jacks 23 are used as outriggers to lift the wheels 22 from the floor and stably support the robot once moved into a desired position at the work site.

Figure 4:
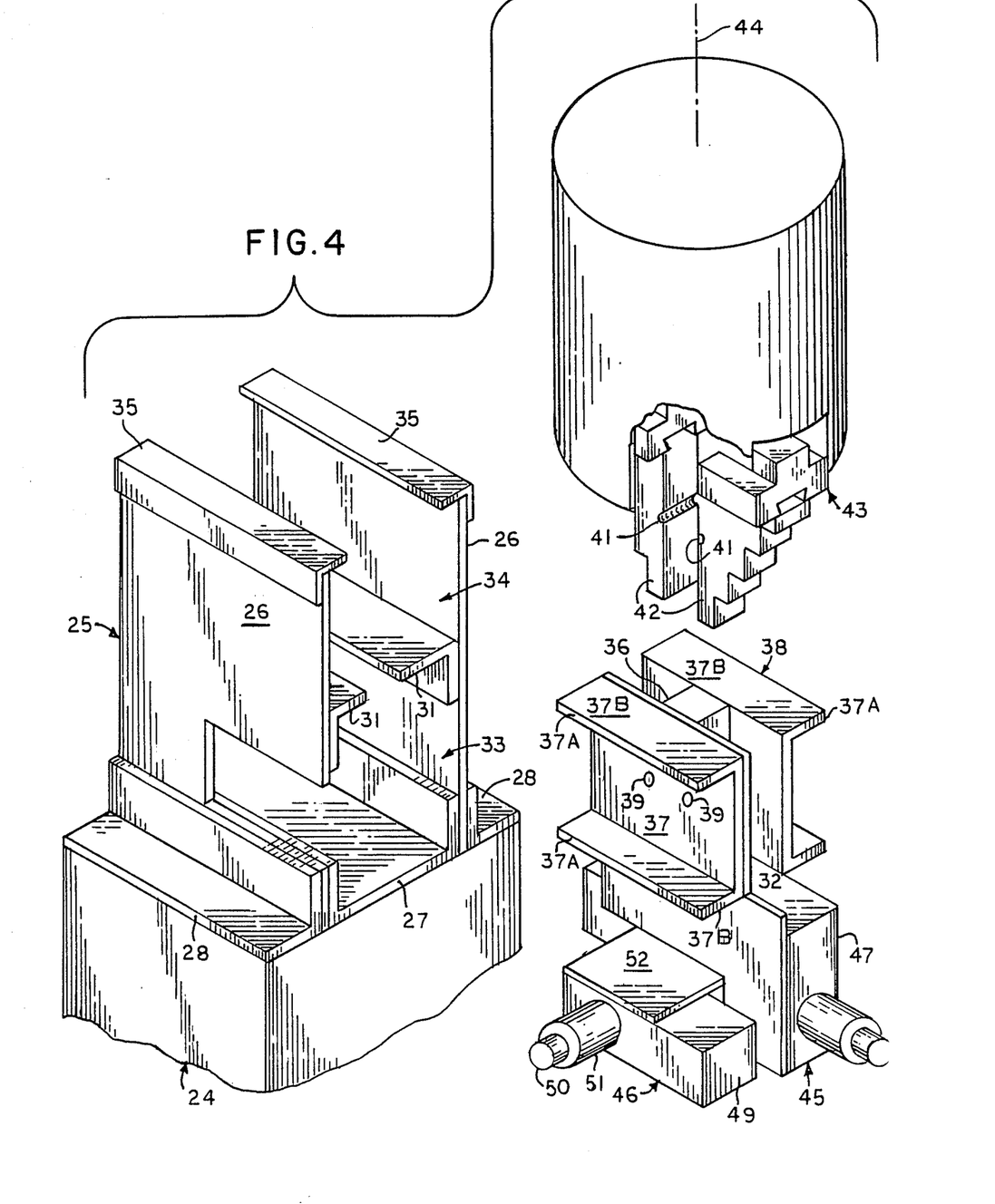
FIG. 4 is an isometric view of a gripper, a sensor assembly and a storage bracket.

Referring again to the illustration of FIG. 1, an upstanding pedestal 24 is fixedly mounted on the top surface of pallet 16 at one corner thereof. A two chamber storage housing 25 for a position sensor is formed in the upper part of the pedestal 24. Cartesian coordinates defining the location of the storage housing 25 are stored in the robotic memory so that the robotic arm can be commanded to move the gripper the exact location of the storage housing. At the storage housing, a sensor assembly can be retrieved by the robotic arm and replaced for storage during periods when the sensor assembly is not in use. The details of the construction of the storage housing as well as the sensor assembly are best shown in FIG. 4. The storage housing 25 is formed by upstanding and spaced apart sidewalls 26 which are held in a spaced apart relation by a bottom spacer channel 27. The spacer channel 27 as well as L-shaped anchor flanges 28 provide a means by which the storage housing is secured to the top surface of a pedestal 24 mounted on the top of pallet 16. About midway along the height of the storage compartment 25 there is secured to the inside surfaces of each wall 26 an L-shaped shelf member 31. These shelf members along with the roof angle member 35 form a chamber 34 with one open side into which the block-like handle 38 of the sensor assembly 47 fits with precision. A gap between the shelf members 31 receives therein a middle part of a back bone plate 32 when the lower part is contained in a bottom storage compartment 33 defined by the area below shelf members 31 and bottom spacer channel 27. The roof angle members 35 have a gap between the confronting edges which permits the passage of the gripper fingers 41 and 42 so that they can grip the vertical bar 36 secured between support channel members 37 which form a box like handle 38 for the sensor assembly 47. The back bone plate 32 is clamped between the vertical bar 36 and one of the support channel members 37. Vertical guide edges 37A on channel members 37 can slide horizontally along inside faces of walls 26 while horizontal guide faces 37B pass between parallel surfaces of the shelf members 31 and roof angle member 35. In this way the robotic arm can move the handle 38 horizontally to a precise storage position in compartment 34. The vertical bar handle 36, as shown in FIGS. 3A–3C and FIG. 4, has opposed faces 36A along which pins 39 extend between channel members 37. The pins 39 which span the gap between channel members 37 adjacent the handle member 36 fit into the grooves 41 in gripper fingers 42. The gripper fingers have flat face surfaces which can be brought into engagement with the faces 36A of the handle member 36. The inter-fitting relationship between the pins and the grooves ensure that the sensor assembly cannot slide out of the grasp of the fingers and at the same time accurately fixes the vertical position of the sensor assembly relative to the gripper. The gripper fingers are moved so as to grip the vertical bar 36 between the fingers by an actuator in a manner per se well known in the art. The gripper fingers which remain parallel while moving are part of a gripper assembly 43 which is secured to the robotic hand 12 such that pursuant to a program in the robotic controller 14, the axis 44 of the gripper assembly always remains parallel with the axis of the box like 38 handle when the gripper assembly is positioned for gripping or releasing the vertical bar of the handle. The sensor assembly 45 includes 3 snap-action microswitches 46, 47 and 48 which are mounted onto plate 32, such that the axes of the three switches are mutually perpendicular with one another. This relationship assures that the sensors are disposed for contacting corresponding surfaces in the reference structure. Each of these sensors 46, 47 and 48 includes a movable actuator button 50 in a support sleeve 51 and a body 49 which is on plate 32.

Referring again to FIG. 1, for the purpose of describing the present invention, there is illustrated for example a portion of a production line conveyor 71 by which boxes 72 are conveyed in a sequential fashion to a work station where the box remains stationary while the robot 10 operates to tighten a plurality of bolts 74 on a flange 75 at one side of the box. The feed run of the conveyor is shown by arrow 71A and the return run of the conveyor is shown by arrow 71B.

A reference structure 76 is fixed in position relative to the work location on the conveyor belt. Since the position of the robot at a work station will change each time that the robot is newly positioned at the workstation, it is necessary establish a frame in the robotic memory which matches the reference structure 76. The reference structure 76 is comprised of three mutually perpendicular planar surfaces 77, 78 and 79 which define the XY plane, XZ plane, and the YZ plane, respectively. The surfaces 77–79 are parts of plates that are secured to one another as shown and fixed at a preestablished site on a vertical wall surface 81 by fasteners, not shown. The reference structure 76 can be other structures at the work station which provide three mutually perpendicular reference surfaces. One such surface, for example, can comprise wall surface 81. A tool storage bracket 83 is mounted on the wall surface 81 at a fixed position relative to the reference structure 76. Bracket 83 is similar in design and structure to storage compartment 25 illustrated in FIG. 4 and it is suitable for the storage therein of a tool fitted with a block-like handle as is required by the robot 10 to perform a work task at the work station. For completion of the work task to be performed by the robot 10 in the illustration of FIG. 1, a wrench having the same handle design as shown in FIG. 4 is stored in the storage bracket and is used by the robot 10 to tighten bolts 74 on box 72 when the box stops at the work station. Points representing all positions of the robot tool are described by cartesian coordinates relative to the robot memory frame which has been set up to match the reference structure 76. The robot arm is controlled by a program to move through this series of points to pick up a tool at the tool storage bracket and to perform the task at the work station.

A program in the robotic memory may be provided to operate the robot 10 for movements of the arm relative to the reference structure 76 so as to detect the intersections of the planes of the reference structure. The program is tailored to the particular robot used. The program first delivers a command signal to move the gripper assembly 43 of robotic hand 12 to pick up the position sensor 45 which is stored in compartment 25. Because the storage compartment is fixedly mounted on the same platform as the robot 10, the programmed points required to move the robot hand through a series of moves are defined with respect to the three dimensional reference frame which matches the major X, Y and Z axes of the robot as shown in FIG. 1. The open fingers of the gripper are moved directly above the slot between channel members 37 in alignment with the vertical bar 36. The fingers are then moved downward in a straight line along axis 44 to the proper depth in the slot so that the groves 41 in the fingers are at the same elevation as the pins 39 which cross the slot. The program then causes the fingers to close on the vertical bar. The robot's hand is then moved horizontally in a straight line to withdraw sensor assembly out of the storage compartment 25. Once the sensor assembly has been removed, the program causes the robotic arm to move the hand with the sensor assembly to the predetermined position above the reference structure which it had when the operator drove the vehicle into the approximate position at the work station.

Alternatively, the operator can manually control the robotic arm to guide the sensor to the proper position above the reference structure by controlling the gripper position manually with a joy stick control while viewing the sensor directly or through a closed circuit TV camera.

When the sensor is in the proper position above the reference structure, the operator initiates a command to the robot to run the program which causes it to make all the motions and calculations necessary to cause it to set up a frame in the robot memory which matches the intersection of the planes of the reference structure. No further action is required of the operator.

Figure 5A:
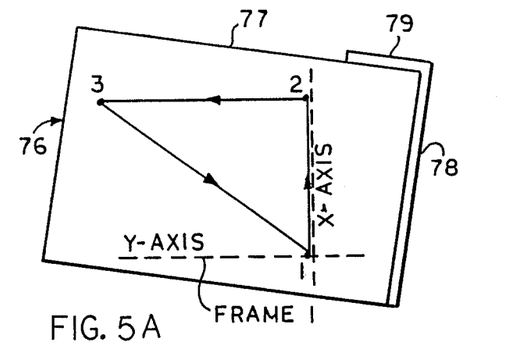
FIGS. 5A, 5B and 5C are plan views of the reference structure which illustrate the three steps required to match a computer reference frame to the geometry of the reference structure at a work station.
Figure 5B:
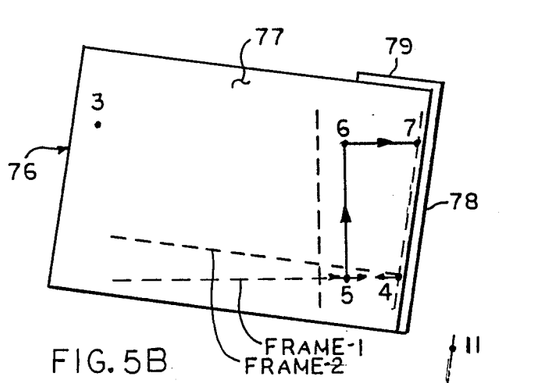
Figure 5C:
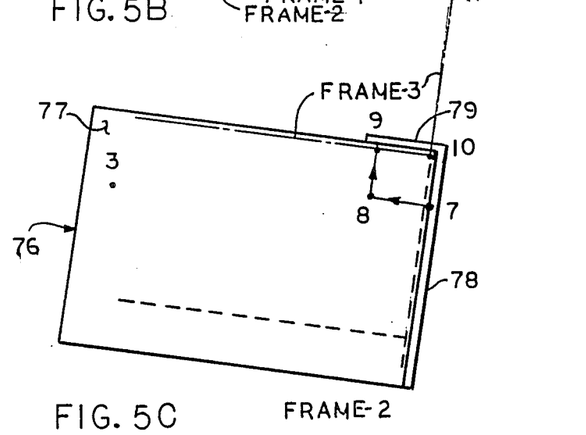

The three major steps of the program to set up a frame which matches the reference structure can be understood by referring to FIGS. 5A, 5B and 5C which are three schematic drawings of the reference structure 76 viewed from above. The solid lines with arrows show the path of the gripper movements while the dotted lines represent the consecutive coordinate axes or "frames" which are stored in the computer memory.

After the operator has positioned the sensor over point 1 in step 1, he turns the further movements over to the program. The robot program moves the sensor down vertically until the Z axis sensor 48 contacts the base plane 77 of the reference structure 76 and stops the movement. The robot stores the six coordinates in the memory and defines them as absolute point 1. It then lifts the sensor up off the base plane and moves it forward along the X axis of the global frame a preselected distance where it again moves the sensor down vertically to contact the base plane 77 of the reference structure to define absolute point 2. It then lifts the sensor up off the base plane and moves it to the left parallel with the Y axis of the global frame a preselected distance where it again moves the sensor down vertically to contact the base plane 77 to define absolute point 3. These three points are used by the robot controller to define frame 1, whose base plane is the same as the base plane of the reference structure 76.

The robot then returns the sensor to point 1. This completes step 1.

The robot then sets frame 1 so that the moves of step 2 are made parallel to the coordinate axes of this frame. The robot moves the sensor parallel to the Y axis until the Y axis sensor 46 contacts the right wall 78 of the reference structure to define absolute point 4. It then pulls the sensor back from the wall, moves it parallel to the X axis of the frame 1 for a prescribed distance, moves toward the right wall 78 until the sensor 46 contacts the wall to define the absolute point 7. Then using points 4 and 7, which are both in the base plane 77 and in the right wall 78 of the reference structure, and point 3 which is in the base plane 77, a new frame, frame 2, is set up. This completes step 2.

The robot backs the sensor away from the right wall a preselected distance and then moves the front pointing X axis sensor 47 parallel with the X axis of frame 2 until the sensor contacts the back wall 79 of the reference structure to define absolute point 9. The robot then calculates the coordinates of point 10, the corner of the reference structure, which is the origin of the desired final frame 3. It then calculates the coordinates of a point further out on the X axis of frame 2 and designates it as absolute point 11. Absolute points 10, 11 and 3 are used to define the final desired frame 3 which matches the intersection of the planes of the reference structure 76.

All points used in the robot programs which cause the robot to pick up a tool from the storage bracket on the back wall and which cause the tool to be used to perform the work task are relative points whose coordinates are designated with respect to frame 3. All robot hand movements are made with respect to this frame regardless of the physical position of the robot itself.

In operation, the portable robot 10 is capable of being transported to different locations in a plant, to perform different work tasks, each having its own program. In the embodiment illustrated in FIG. 1, the forks of a fork lift are first inserted into the opening 17 of the pallet 16. The fork lift then moves pallet 16 and robot 10 situated thereupon to any desired work location. The fork lift operator need only roughly position the robot 10 so that the tool holder 83, the work task 72, and the reference structure 76 are all inside the robot's work envelope. The direction which robot 10 faces when the fork lift sets it down may further vary by plus or minus 10 degrees or even more, and the floor may be tilted by 10 degrees or more in any direction. The robot is then commanded to run the program which automatically sets the robot up with precision at the work station and causes it to proceed with the work task.

The robot 10 first picks up the sensor assembly 45 from the storage bracket 25. It then automatically sets the frame which matches the reference structure 76. It then returns the sensor assembly 45 to the cavities 33 and 34 of the storage bracket 25 and moves to a ready position near the tool storage bracket 83. In the example situation illustrated in FIG. 1, the program causes the robotic hand 12 with the gripper 13 to remove the wrench from the storage bracket 83 and tighten each of the bolts 74 on flange 75. When the robot 10 is no longer required to perform a work task at one work location, the fork lift may remove the robot 10 and position it at a new work location. The robot is then given a new program which causes it to again set itself up automatically at the new location to perform another work task.

While the present invention has been described in connection with the preferred embodiments it is understood that other similar embodiments may be used or modifications and additions may be made to the described embodiment for performing the same function of the present invention without deViating therefrom. For example, a single vertical position sensor may be utilized by the robot 10 in order to set up a frame to match the reference structure 76. In this case, the robot program causes the gripper to swing to a horizontal position pointing to the right to cause the sensor to contact the right wall It then swings the gripper to a horizontal position facing forward to cause the sensor to contact the back wall This method of operation requires a larger reference structure and is therefore not the preferred embodiment.

The present invention, therefore, should not be limited to any single embodiment, but rather construed in breadth and scope in accordance with the recitation of the appended claims.

I claim as my invention:

1. A method for defining an intangible robotic memory frame in a robotic memory of a mobile robot to match a tangible reference structure at each of separate workstations for the robot or each time the robot is newly positioned at a workstation, said method including the steps of;

newly positioning the mobile robot at one of said workstations;

using a position sensor on a robotic arm of said mobile robot to establish a first intangible robotic memory frame matching a first plane of said tangible reference structure;

using said position sensor and the first intangible robotic memory frame to establish a second intangible robotic memory frame which matches the first tangible plane and a second tangible plane perpendicular to said first plane of said tangible reference structure, said second intangible robotic memory frame includes said first intangible robotic memory plane and;

using said position sensor and said second intangible robotic memory frame to establish a third intangible robotic memory frame which matches the first and second tangible planes and a third tangible plane perpendicular to said first plane and said second plane of said tangible reference structure, said third intangible robotic memory frame includes said second intangible robotic memory frame.

2. A method for defining an intangible robotic memory frame in a robotic memory of a mobile robot to match a tangible reference structure at each of separate workstations for the robot or each time the robot is newly positioned at a workstation, said method including the steps of;

newly positioning the mobile robot at one of said workstations;

using a position sensor held by a robotic arm of said mobile robot to establish a first intangible robotic memory frame in the robotic memory which matches an XY base plane of said tangible structure;

using said position sensor held by a robotic arm of said mobile robot to establish a second intangible robotic member frame which matches both the XY and XZ planes of the said tangible reference structure and;

using a position sensor held by the robotic arm of said mobile robot to establish a third intangible robotic memory frame which matches the XY, XZ, YZ planes of said tangible reference structure.

3. The method according to claim 2 wherein said position sensor is a momentary type switch which operates to stop the movement of the robotic arm when the switch is actuated by contact with one of planar surfaces of said tangible reference structure.

4. The method of claim 2 wherein said position sensor includes three momentary type switches, having their operating axes mutually perpendicular to each other and connected in series electrically so that any one of the switches will stop the movement of the robot arm when the switch is actuated by contact with said tangible reference structure.

5. Apparatus to define a desired intangible robotic memory reference frame in terms of absolute points in a robotic memory of a mobile robot, said apparatus including the combination of:

means for moving said mobile robot at one of separate workstations or newly positioning the robot at a workstation;

a tangible reference structure having a plurality of reference planes for defining absolute reference points of a desired intangible robotic memory frame in said robotic memory;

means for producing a plurality of signals to generate a first intangible robotic memory frame matching a first plane of said tangible reference structure; and a second intangible robotic memory frame which includes said first intangible robotic memory frame and a second intangible robotic memory frame, and a third intangible robotic memory frame which includes said first and second intangible robotic memory frames.

6. The apparatus according to claim 5 wherein said tangible reference structure for defining a plurality of reference planes includes three mutually perpendicular planar surfaces supported within the robot work envelope.

7. The apparatus according to claim 5 wherein said tangible reference structure for producing a plurality of signals includes at least one which having a moveable activator button.

8. The apparatus according to claim 5 wherein said tangible reference for producing a plurality of signals includes three switches each having a moveable actuation button, and a support for said switches to direct each switch toward one of the three mutually perpendicular reference planes of said tangible reference structure.

9. The apparatus according to claim 5 wherein said tangible reference structure for defining a plurality of reference planes includes three mutually perpendicular planar surfaces supported within a work envelope of said robot.

10. The apparatus according to claim 5 wherein said means for allowing includes a wheeled vehicle.

11. The apparatus according to claim 10 wherein said wheeled vehicle is motorized.

12. The apparatus according to claim 5 wherein said means includes a pallet upon which said robot is fixedly mounted and a fork lift means for transporting said pallet and the robot mounted thereupon.

13. The apparatus according to claim 5 wherein said tangible reference structure is fixedly positioned relative to a work location, and wherein said means for producing a plurality of signals includes a position sensor held by the robot, and an orientation program contained in the robotic memory to allow the robot to orient the memory with respect to the reference structure and therefore to the work location.

14. The apparatus according to claim 13 wherein said tangible reference structure includes a first planar surface, a second planar surface, and a third planar surface, each of said planar surfaces being mutually perpendicular to one another.

15. The apparatus according to claim 5 further including storage means including a sensor tool and a storage bracket to support said tool for straight line mutually perpendicular movement of the tool to allow the programmed pickup and storage of tools and sensors.

16. The apparatus of claim 5 wherein the tangible reference structure is located at a fixed location relative to the work location and wherein said means for producing a plurality of signals includes running an orientation program contained in the robotic memory to allow the robot to orient its memory with respect to the reference structure and therefore to the work location.

* * * * *